United States Patent [19]

Western

[11] Patent Number: 5,405,651
[45] Date of Patent: Apr. 11, 1995

[54] METHOD OF MASKING SEALING GASKETS

[76] Inventor: Donald M. Western, 1 Albion Rd., Sutton, Surrey, SM2 5TA, England

[21] Appl. No.: 107,779
[22] PCT Filed: Feb. 21, 1992
[86] PCT No.: PCT/GB92/00322
§ 371 Date: Aug. 23, 1993
§ 102(e) Date: Aug. 23, 1993
[87] PCT Pub. No.: WO92/14554
PCT Pub. Date: Sep. 3, 1992

[30] Foreign Application Priority Data

Feb. 23, 1991 [GB] United Kingdom ............... 9103818
Jul. 16, 1991 [GB] United Kingdom ............... 9115373

[51] Int. Cl.⁶ ................... B05B 15/04; B05D 3/12
[52] U.S. Cl. ................... 427/272; 427/282; 427/284; 427/421; 118/44; 118/72; 118/301; 118/213; 81/485
[58] Field of Search ............... 156/108, 102; 52/208, 52/403; 427/272, 282, 171, 284, 300, 421; 29/239; 81/485; 254/104; 118/44, 301, 504, 72, 213

[56] References Cited

U.S. PATENT DOCUMENTS

| | | | |
|---|---|---|---|
| 2,189,138 | 2/1940 | Eichner | 52/208 |
| 2,430,873 | 11/1947 | Haas | 52/208 |
| 4,313,970 | 2/1982 | Jones et al. | 427/282 X |
| 4,433,463 | 2/1984 | DuVal | 29/239 |
| 4,697,789 | 10/1987 | Parkins | 254/104 |

FOREIGN PATENT DOCUMENTS

0424114A2 4/1991 European Pat. Off. .
8623273 10/1986 Germany .
440982 9/1985 Sweden .

*Primary Examiner*—Michael W. Ball
*Assistant Examiner*—Francis J. Lorin
*Attorney, Agent, or Firm*—Lowe, Price, LeBlanc & Becker

[57] ABSTRACT

The invention provides an improved system for masking the free edge of a window gasket in preparation for repainting or refinishing a vehicle. The system includes a method of painting a vehicle which comprises introducing a flexible plastic strip (10) beneath a window sealing gasket (12) in the vicinity of a part of the vehicle to be painted, the plastic strip (10) having a tapered profile in cross section so that as the strip (10) is pressed beneath the gasket (12), the latter is lifted and held in the raised position, masking the edge of the raised gasket (12) and applying paint to the vehicle so that paint reaches the area normally covered by the edge of the gasket. Generally, the strip (10) is a plasticised polymer in the form of a triangular cross section having one side (14) longer than the other two (15, 18). An applicator is also described which comprises a handle and a pointed end for lifting the free edge of a window sealing gasket, the applicator having a recess or aperture adjacent to the pointed end, the recess or aperture being shaped to correspond approximately with the cross section of the flexible, plastic strip (10).

12 Claims, 3 Drawing Sheets

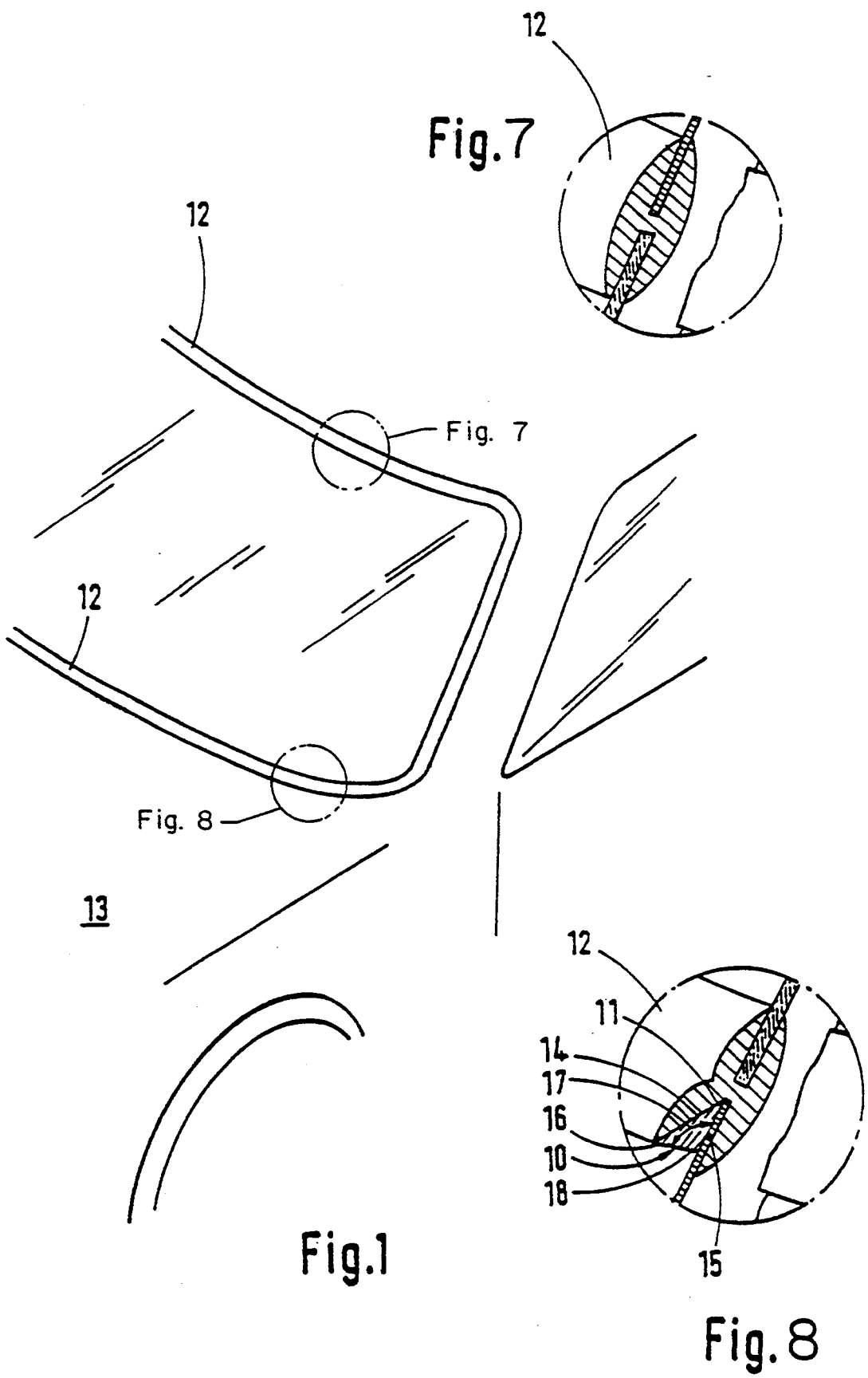

METHOD OF MASKING SEALING GASKETS

FIELD OF INVENTION

This invention relates to a method of masking sealing gaskets. More especially, but not exclusively, the invention relates to a method of masking window sealing gaskets, for example, in the course of painting or refinishing a vehicle.

BACKGROUND ART

The windows of vehicles, particularly road vehicles, are frequently held in place in the vehicle frame using rubber or plastics window sealing gaskets and which are sometimes known as sealing rubbers. The free edge of the sealing gasket commonly rests on a painted surface and when the vehicle requires to be painted or refinished, e.g. after an accident, it is difficult and time consuming to accurately place a masking strip along the edge of the window gasket. Commonly, the net result is that the paint either does not reach up to the edge of the gasket or, more often the gasket is coated at its edge with paint which needs to be cleaned off as a final step.

Swedish Patent Application No. 440982 describes a system for lifting window gaskets in which a round section strip is pressed under the gasket by feeding the strip through an applicator having a tubular guide. This system has not been successful in practice and there have been difficulties in accurately placing the strips beneath the gasket and also in the strip becoming misplaced or misaligned during the re-painting or re-finishing operation.

SUMMARY OF THE INVENTION

The present invention is concerned with the provision of an improved system for lifting the edge of a gasket including an improved design of lifting strip and a more reliable and convenient method for feeding a flexible plastic strip beneath the gasket.

According to one aspect of the present invention is provided a method of painting a vehicle which comprises introducing a flexible plastics strip beneath a window sealing gasket in the vicinity of a part of the vehicle to be painted, the plastics strip having a tapered profile in cross-section so that as the strip is pressed beneath the gasket, the latter is lifted and held in the raised position, masking the edge of the raised gasket and applying paint to the vehicle so that paint reaches the area normally covered by the edge of the gasket.

The invention also provides a method of painting an object having a resilient gasket which comprises introducing a flexible plastics strip beneath the gasket, the plastics strip having a tapered profile in cross-section so that as the strip is pressed beneath the gasket, the gasket is lifted and held in a raised position, masking the edge of the raised gasket and applying paint to the object so that paint reaches the area normally covered by the edge of the gasket.

Preferably, the flexible plastics strip is formed from a plasticised polyvinyl chloride. The plastic strip may be transparent or colored and may be printed or coloured on one surface to show the surface which is placed in contact with the underface of the window gasket or rubber.

It is an advantage of the lifting strip of the present invention that it may be rapidly inserted by hand under the window sealing gasket without requiring a special tool. However, it may be more convenient to introduce the plastics lifting strip by means of an applicator having a pointed end for lifting the free edge of the window rubber and has a recess or aperture for receiving the plastics strip, the recess or aperture having a configuration which substantially corresponds to the cross-section of the plastics strip.

In use, the plastics strip may be inserted in the aperture or recess in the applicator, the pointed end of the applicator being pushed under the edge of the window rubber and the applicator pushed along underneath the edge of the gasket to introduce the strip underneath the edge of the gasket and lift it free from the painted bodywork.

The plastics strip is normally triangular in cross-section but slight variations from a triangular profile are possible, e.g. trapezium shaped. In use the more sharply tapered portion (or one of the sharply tapered portions) of the strip is inserted under the gasket. Typically, the angle between the sides forming the tapered portion is from about 20° to 40°, preferably 25° to 35°. The side which is in contact with the underside of the gasket is preferably dimensioned so that it extends substantially to the free edge of the gasket. The other side forming the tapered portion is preferably shorter in order to ensure that paint can reach beneath the area normally covered by the extreme edge of the gasket.

In a modification, the lifting strip may include a flange portion which extends generally in the direction of the tapered portion and in use lies over the top of the free edge of the gasket, thus masking the edge from paint spray.

BRIEF DESCRIPTION OF THE DRAWING

Further details of a vehicle re-finishing system in accordance with the invention will be apparent from the accompanying drawings, in which:

FIG. 1 is a view showing the plastics lifting strip beneath a window sealing gasket

FIGS. 7 and 8 are cross-sections of the window sealing gasket shown in FIG. 1.

DESCRIPTION OF THE PREFERRED EMBODIMENTS

Figure 1A:
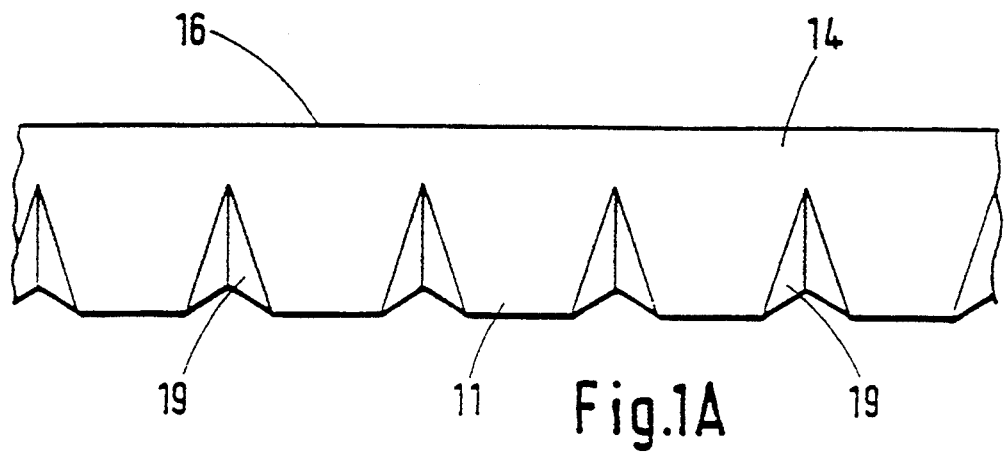
FIG. 1A is a view of a modified lifting strip.

Referring to the drawings and particularly to FIG. 1, the plastics lifting strip comprises an extended length 10 of plasticised polymer material, preferably plasticised PVC. As can be seen from FIG. 1 and FIGS. 7 and 8, strip 10 has a shape and an edge 11 which can be pushed under a window gasket 12 in order to cause the gasket to be pivoted upwardly to expose that part of the body work surface 13 of what is normally covered by the free edge of the gasket 12. In order to provide the full support for the lifted face of the gasket, the side 14 approximately corresponds to the depth of the pivoted part of the gasket. The face 15 which contacts the surface of the body work makes an acute angle with the face 14, e.g. of about 30°. In use, the strip may be fed by hand underneath the gasket (or by using the applicator described below) until the edge 16 is approximately coincident with the face edge of the gasket. Angle 17 between faces 15 and 18 is obtuse so as to leave a clear space beneath the strip 10 which the paint may reach during the subsequent re-finishing step. Preferably the side 15 is shorter than side 18. By making the strip from highly plasticised PVC and in the profile described it is possible to push the strip around the corner of the window gasket without cutting the strip. However, in certain circumstances it may be advisable to make small nicks 19 in the edge 11 of the strips as shown in FIG. 1A.

DESCRIPTION OF THE PREFERRED EMBODIMENTS

Referring particularly to FIGS. 2 to 6 of the drawings, the applicator is conveniently manufactured as a one-piece moulding from a substantially rigid material and comprises a handle portion 1 suitably shaped to fit in the hand. The applicator has a pointed end 2 providing a wedge-shaped end for insertion under the free edge of a window gasket 3. An aperture 4 is formed in the applicator in the vicinity of the pointed end 2 and as shown best in FIG. 6, the aperture is shaped to correspond with the profile of the lifting strip 5. In a preferred form, the forward edge 6 of the applicator is chamfered in the direction of intended movement of the applicator under the window rubber in order to facilitate introducing of the tape therein.

The preferred method of introducing the lifting strip is to cut a length which is sufficiently long for lifting the edge of the window gasket in the area where the painting work is to be carried out. Having cut a suitable length, this is fed into an aperture 4 in the applicator so that essentially all the strip projects from the applicator in the direction in which the tape is intended to be introduced. The end 2 is then inserted under the window gasket 3 and preferably, while holding the shorter projecting end beneath the gasket, the applicator is pressed along and underneath the window gasket so that as it progressively moves along between the gasket and the car body 7, the tape is introduced and remains between the rubber and the body of the car. In this movement, the applicator slides over the tape which lies substantially stationary underneath the gasket. The applicator is finally pushed off the end of the strip which then stays in position under the window gasket. In the illustration shown in the accompanying drawings, the applicator as shown would be more suitable for a lefthanded operative since it is most easily used by pushing it away from the user.

After placing the tape beneath the window gasket the tape takes up the form as shown in FIG. 1 and FIGS. 7 and 8. As can be seen the preferred form of the gasket has a triangular cross-section with sides 15 and 18 shorter than the side 14, and the angle between the two shorter sides being greater than 90° so that paint can penetrate to a part of the vehicle body which lies beneath the normal rest position of the window gasket edge. By way of example, the sides 15 & 18 may be about 4 to 7 mms long while the side 14 is longer and is, e.g. from about 7 to 10 mms long. In a typical arrangement, sides 15 and 18 are about 5 to 6 mms long and side 14 about 9 to 10 mms long.

Prior to painting, masking tape may be applied over the window gasket edge so that it covers the free edge of the gasket. This is easily accomplished with the gasket edge lifted from the surface of the vehicle, and masking tape can overlap the edge and the apex 5 of the plastics flexible strip 4. The vehicles can then be finished, e.g. by spraying with a suitable undercoat and topcoat and after curing, the masking tape can be stripped off and the lifting strip removed and discarded. Because of the greater ease of masking the edge of the strip, no cleaning up is necessary and it is not possible to see any line between the original paint and the refinished paint.

Figure 1B:
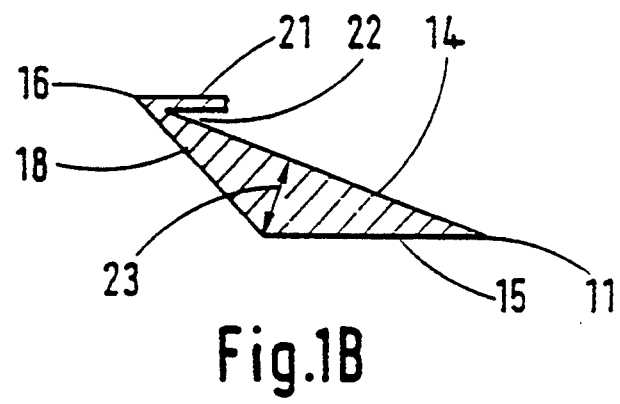
FIG. 1B is a cross-section of another modified form of the lifting strip.
Figure 2:
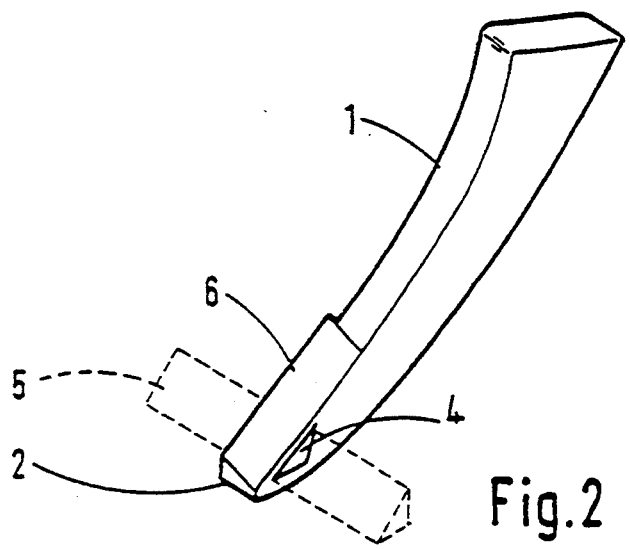
FIG. 2 is an isometric view of an applicator in accordance with the invention with the lifting strip shown in broken lines.
Figure 3:
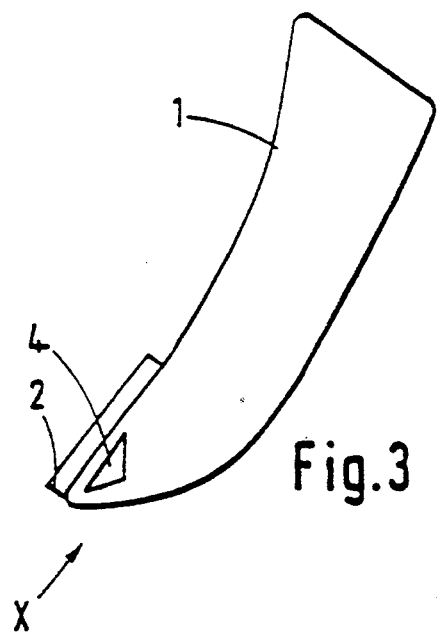
FIG. 3 is an elevation view of the applicator.
Figure 4:
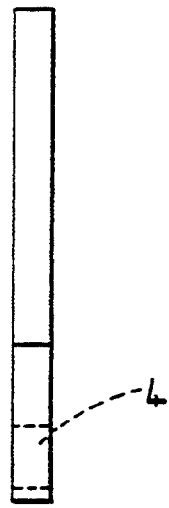
FIG. 4 is a side view of the applicator.
Figure 5:
FIG. 5 is a view in the direction of the arrow X in FIG. 3.
Figure 6:
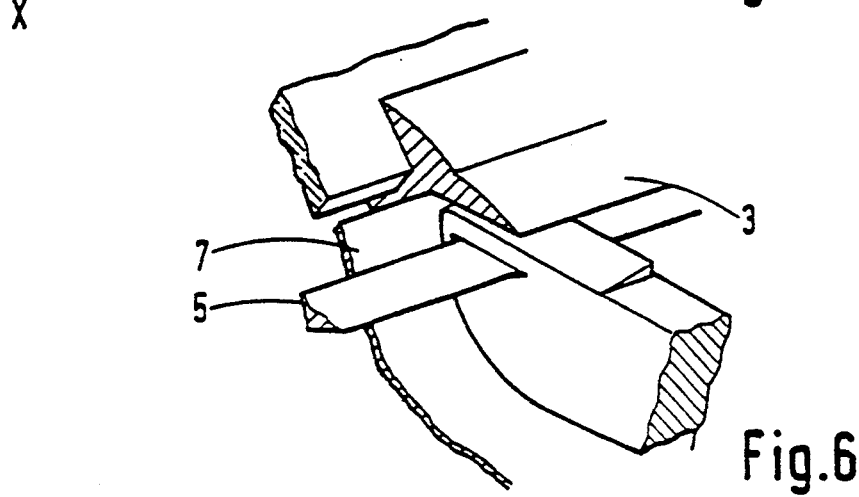
FIG. 6 is a perspective view of the applicator showing the introduction of the lifting strip beneath the edge of the rubber.

FIG. 1B shows a modified form of the lifting strip which incorporates an integral masking flange 21 for the free edge of the window gasket. Apart from flange 21, the cross-section of the lifting strip shown in FIG. 1B corresponds to that of FIGS. 7 and 8. Flange 21 extends a few millimeters in the general direction of the apex 11 of the tapered portion In use, the lifting strip is pushed under the window gasket until the free edge of the latter lodges in the groove 22. Masking of the gasket can then be neatly achieved by just overlapping the tape onto The flange 21.

The preferred dimensions of the sides of the lifting strip are referred to above. The thickness of the strip may vary but preferably the dimension 23 (see FIG. 1B, but this applies to all embodiments) is about 3 to 5 mms, preferably about 4 mms.

It has been found that plasticised pvc is a satisfactory material for manufacture of the lifting strip and can be fed around corners of windows without cutting. Also, it will withstand shearing to temperatures of the order of 60° C. The lifting strip is conveniently produced by hot extrusion from a plasticised pvc paste, e.g. containing dioctyl phthalate or tricresyl phosphate as plasticisers. One suitable pvc compound has a BS softness of about 45, a shore A hardness of about 74 and a relative density at 23° C. of about 1.22. A suitable commercial compound is available from Welvic Limited, under trade designation No. GC 4/770.

The invention has been described by reference to methods of painting vehicles. It is to be clearly understood that the invention is not restricted to such methods. Those skilled in the art will appreciate that the invention will be usable in other fields. By way of example, windows are held in frames by gaskets in many double glazed buildings. It is, furthermore, by no means essential that the gasket retain a window, a wide range of panels are joined with resilient gaskets and grommets including, for example, cladding panels in railway carriages.

Furthermore, the invention need not be restricted to painting. It may be desired to apply other surface treatments including anti-corrosion or cleaning materials. Still further, no surface treatment need by applied at all since the method of the invention is readily adapted for inspecting the surface under the gasket, for example, for damage.

I claim:

1. A method of painting an object having a resilient gasket attached thereon comprising the steps of: a) introducing a flexible plastic strip beneath the gasket, the plastic strip having a triangular profile in cross-section so that as the strip is pressed beneath the gasket, the gasket is lifted and held in a raised position, thereby masking the edge of the raised gasket; and then applying paint to the object so that paint reaches the area normally covered by the edge of the gasket.

2. A method of painting a vehicle comprising the steps of: a) introducing a flexible plastic strip beneath a window sealing gasket in the vicinity of a part of the vehicle to be painted, the plastic strip having a triangular profile in cross-section so that as the strip is pressed beneath the gasket, the latter is lifted and held in the raised position, thereby masking the edge of the raised gasket, and then applying paint to the vehicle so that paint reaches the area normally covered by the edge of the gasket.

3. A method according to claim 1 in which the flexible strip is introduced by means of an applicator having a pointed edge for lifting the free edge of a gasket and a recess or aperture for receiving the plastic strip, said recess or aperture having a configuration which substantially corresponds to the cross-section of the plastic strip.

4. A method according to claim 1 in which the plastic strip has sides of unequal length as viewed in the cross section, the longer side being intended to contact the inner face of the edge of the gasket and the angle opposite the longer side being greater than a right angle.

5. The method of claim 3 wherein said applicator has a handle and a pointed end for lifting a free edge of the sealing gasket.

6. The method of claim 2 wherein said flexible plastic strip comprises a length of flexible plastic material having a uniform, triangular cross-section whose sides are of unequal length, the largest side being intended to contact the inner face of the gasket.

7. The method of claim 6 wherein said plastic strip has a flange portion forming a recess for accommodating the free edge of the gasket in use.

8. The method of claim 2 wherein the plastic strip is formed from plasticized PVC.

9. The method of claim 1 wherein the plastic strip is formed from plasticized PVC.

10. A method according to claim 2 in which the flexible strip is introduced by means of an applicator having a pointed edge for lifting a free edge of a gasket and a recess or aperture for receiving the plastic strip, said recess or aperture having a configuration which substantially corresponds to the cross-section of the plastic strip.

11. The method of claim 10 wherein said applicator has a handle and a pointed end for lifting a free edge of the sealing gasket.

12. The method of claim 4 wherein said plastic strip has a flange portion forming a recess for accommodating a free edge of the gasket in use.

* * * * *